United States Patent [19]

Kriz

[11] Patent Number: 5,410,481
[45] Date of Patent: Apr. 25, 1995

[54] METHOD OF DETERMINING THE RATE OF ROTATION OF VEHICLES AND VEHICLE ARRANGEMENT FOR IMPLEMENTING THE METHOD

[75] Inventor: Helmut Kriz, Lachendorf, Germany

[73] Assignee: TZN Forschungs-und Entwicklungs-zentrum Unterlüss GmbH, Unterlüss, Germany

[21] Appl. No.: 834,380

[22] Filed: Feb. 12, 1992

[30] Foreign Application Priority Data

Mar. 4, 1991 [DE] Germany ............... 41 06 767.3

[51] Int. Cl.⁶ ............................................. G06F 15/50
[52] U.S. Cl. .............................. 364/424.05; 364/449
[58] Field of Search ..................... 364/424.05, 424.02, 364/449, 454

[56] References Cited

U.S. PATENT DOCUMENTS

| 4,148,452 | 4/1979 | Niessen et al. | 244/195 |
|---|---|---|---|
| 4,791,574 | 12/1988 | Thoone et al. | 364/457 |
| 4,816,998 | 3/1989 | Ahlbom | 364/424.02 |
| 5,040,122 | 8/1991 | Neukirchner et al. | 364/449 |
| 5,203,220 | 4/1993 | Lerman | 74/5.22 |

FOREIGN PATENT DOCUMENTS

| 0270416A1 | 6/1968 | European Pat. Off. |
| 0289803A3 | 11/1988 | European Pat. Off. |
| 3135117A1 | 4/1982 | Germany . |
| 3111130A1 | 9/1982 | Germany . |
| 3910945 | 10/1990 | Germany . |

OTHER PUBLICATIONS

Patent Abstracts Of Japan, vol. 13, No. 440 (P-940)4, Oct. 1989.

Primary Examiner—Kevin J. Teska
Assistant Examiner—Susan Wieland
Attorney, Agent, or Firm—Spencer, Frank & Schneider

[57] ABSTRACT

A method of determining vehicle rotation rates while suppressing interferences caused by sensor principles. In particular, the time-dependent drift of prior art gyro systems is to be avoided in the navigation of driverless transportation systems, and faulty reactions of wheel sensors with respect to the direction information of the vehicle, for example when passing through potholes, are to be avoided. This is accomplished by a method according to which a rotation rate signal (18) generated in a gyro arrangement (12) passes through a highpass filter (20) and a rotation rate signal (22) generated by wheel sensors passes through a lowpass filter (24), and the two then occurring individual signals (18', 22') are combined for a determination of the actual vehicle rotation rate. The blocking effect of the lowpass filter eliminates the sensor caused high frequency rotation rate signals from the wheel sensors which are generated, for example, during the passage through a pothole so that they cannot have an interfering influence on the determination of the vehicle rotation rate. Moreover, the highpass filter eliminates low frequency interferences caused, for example, by the drift of a gyro. By linking the filtered measured rotation rate signals it is possible to easily and quickly determine the position angle of a driverless vehicle.

7 Claims, 2 Drawing Sheets

METHOD OF DETERMINING THE RATE OF ROTATION OF VEHICLES AND VEHICLE ARRANGEMENT FOR IMPLEMENTING THE METHOD

BACKGROUND OF THE INVENTION

The present invention relates to a method of determining the rate of rotation of vehicles. More particularly the present invention relates to a method of determining the actual rotation rates of a vehicle wherein a path sensor generates signals corresponding to the movement of the vehicle and a gyro arrangement continuously detects the orientation of the vehicle, and with the signals generated by the path sensor and by the gyro arrangement being processed in an evaluation circuit. The invention also relates to vehicle arrangements for implementing the method.

Federal Republic of Germany published patent application DE 3,111,130.A1 discloses the derivation of a vehicle rate of rotation from a gyro navigation system. The drawback in this prior art gyro system is its inherent characteristic of a time-dependent drift because of which a time dependent deviation from the desired course, particularly in driverless vehicles, cannot be avoided.

Federal Republic of Germany published patent application No. DE 3,003,287.A1, corresponding to U.S. Pat. No. 4,816,998, discloses a self-propelled vehicle in which freely running rear wheels provided with angle sensors are provided for the purpose of obtaining information about the length of the path and a circle radius for guiding the vehicle. Wheel sensors are here employed as the angle sensors. However, these wheel (angle) sensors are subject to interference if, for example, the vehicle wheel runs through a pothole. Such interference causes the wheel sensor to loose the direction information of the vehicle because, during passage through this pothole, the rate of rotation of at least one wheel is statistically changed and thus, accordingly, a high vehicle rate of rotation is reported for a short time which leads to faulty reactions on the part of the vehicle.

SUMMARY OF THE INVENTION

It is an object of the present invention to suppress the above type interferences caused by the sensor principle in the determination of the vehicle rate of rotation.

The above object generally is achieved according to the present invention by a method of determining the actual rotation rate of a vehicle provided with wheel sensors configured as path sensors for detecting the vehicle movement and a gyro arrangement for detecting the orientation of the vehicle, with the method comprising: generating signals corresponding to the movement of the vehicle by the path sensors; continuously detecting and producing output signals corresponding to the orientation of the vehicle by the gyro arrangement; processing the respective signals generated by the path sensors and by the gyro arrangement to form respective rotation rate signals; highpass filtering each rotation rate signal generated in response to an output signal from the gryo arrangement; lowpass filtering each rotation rate signal generated in response to output signals from the path sensors; and combining the individual highpass and lowpass filtered signals to determine the actual rotation rate of the vehicle.

With the method according to the invention, roadway specific interfering influences such as, for example, a pothole are advantageously no longer able to exert a negative influence in the determination of the existing vehicle rate of rotation. Sensor specific high frequency rate of rotation signals from the wheel sensors caused by an interference and occurring, for example, during the passage through a pothole are eliminated by the blocking effect when they pass through a lowpass filter and therefore no longer have an interfering influence in the determination of the actual rate of rotation of the vehicle.

Moreover, a low frequency interference caused by the drift of a gyro is advantageously avoided with respect to the determination of the actual rate of rotation of the vehicle in that the rotation rate generated by the gyro system must pass through a highpass filter, thus avoiding the falsifications caused by the drift.

By linking the two above-described filtered rotation rate measuring signals it is possible in a particularly simple and fast manner to determine the position angle of a driverless vehicle. In particular, the simple elimination of drift permits the use of economical gyro systems as they are available on the market.

The invention will be described below in greater detail with reference to two embodiments thereof that are illustrated in the drawing figures.

DETAILED DESCRIPTION OF THE PREFERRED EMBODIMENTS

Figure 1:
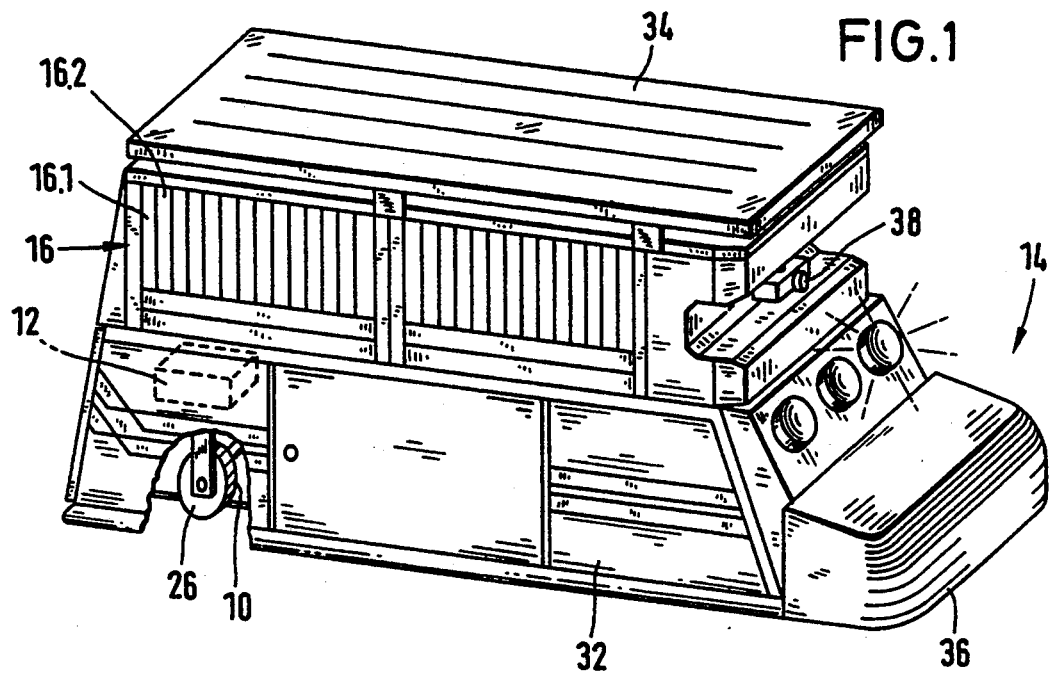
FIG. 1 is a perspective view of a driverless vehicle.

FIG. 1 shows an autonomous, driverless transport vehicle 14 which requires no material guide rails for steering and therefore has a high flexibility for changes in its intended path. Angle and path measuring sensors are carried along and are employed for orientation and to generate the steering movements. The orientation is here effected with the aid of inertial systems such as gyros 12 and/or with the aid of suitable sensors (path sensor 10) from objects in the normal surroundings of its use.

Vehicle 14 is essentially composed of the following component groups:

A chassis 32 which forms a force receiving cell and is provided in its upper region with a platform 34 for the installation of customer specific user devices. A steering system (not shown) provided in the front part of the vehicle, which may be composed, for example, of only a steering wheel, is equipped, in a known manner with drive motors and gear assemblies, while the rear region of the vehicle includes two vehicle wheels 26 that are provided on either side and merely run along, i.e. they are free-wheeling or non-driven.

The forward region of the vehicle 14 is provided with known distance sensors 36 which serve as a safety device to prevent collisions. The vehicle 14 may be operated automatically, manually or according to a training mode for which purpose a camera 38 is disposed in the upper forward region of the vehicle 14 for the training trip. An evaluation circuit 16 includes various electrical inserts 16.1, 16.2, etc. in which all functions are centrally controlled. For example, an insert 16.1 serves the purpose of causing the axle control to convert the steering instructions into engine actuation instructions. Another insert 16.2 is provided with an electronic unit for deriving location information from the drive sensor.

Figure 3:
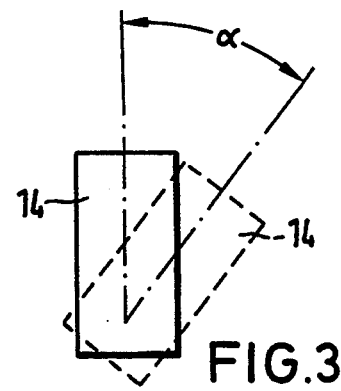
FIG. 3 is a schematic representation of the vehicle rotation angle.
Figure 4:
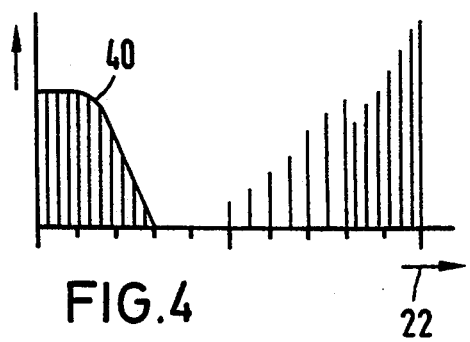
FIG. 4 is a schematic representation of the curve for rotation rate signals that are filtered through a lowpass filter.

Independently rotatable rear wheels 26 serve as path sensors 10 and, in a conventional manner, are provided with electrical sensors for determining the path traversed. If the measured path of the one rear wheel 26 differs from that of the other, the vehicle 14 has turned about a rotation angle $\alpha$ shown in FIG. 3. In this way the vehicle rotation rate $\phi$ can be calculated from the outputs of the wheel sensors 10 with the aid of evaluation circuit 16 and can be converted into corresponding electrical rotation rate signals 22. In order for interferences on the path, for example a pothole, not to adversely affect the measuring results and particularly in order for the then occurring high frequency rotation rate signals 40 (FIG. 6) not to cause the vehicle to react in a faulty manner, the rotation rate signal 22 determined by wheel sensor 10 is fed to a lowpass filter 24 (see FIG. 2) which passes only the rotation rate signals 22 occurring during normal, interference-free operation of vehicle 14. The lowpass filter 24 may be designed, for example, so that it suppresses high frequency (HF) interferences in a range between a rotation rate of 10°/sec and a rotation rate of 90°/sec and passes rotation rates of $\leq$ 10°/sec. FIG. 4 illustrates this characteristic of the lowpass filter 24. Then only the electrical signals enclosed by curve 40 representing a relatively low vehicle rotation rate 22 manage to pass through lowpass filter 24.

Figure 5:
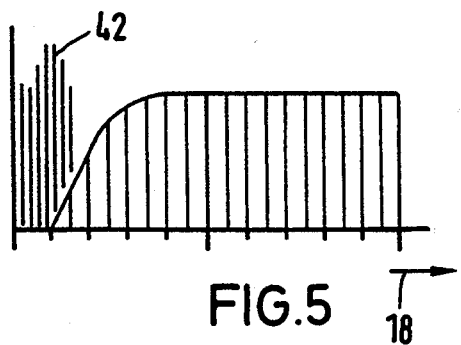
FIG. 5 is a schematic representation of the curve for rotation rate signals that are filtered through a highpass filter.
Figure 6:
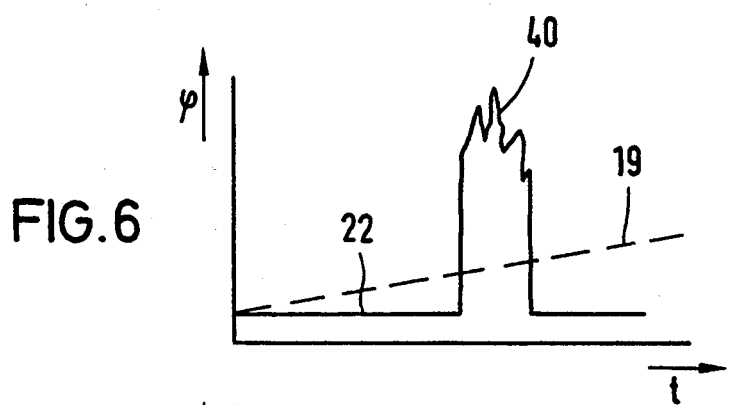
FIG. 6 shows the curve of the rotation rate signal for a gyro that is drifting and with the wheel sensor under extraneous interfering influences.

In order to avoid the above-described gyro drift 18 shown in FIG. 6, which may be, for example, 10°/h, the vehicle rotation rate signal 18 determined by the gyro system must pass through a highpass filter 20. The characteristic of such a highpass filter 20 is shown in FIG. 5. Accordingly, low vehicle rotation rate signals 42 corresponding to drift 19 are not considered by highpass filter 20, while, for example, vehicle rotation rate signals 18 of $\geq$ 10°/h are able to pass through the highpass filter 20.

Figure 2:
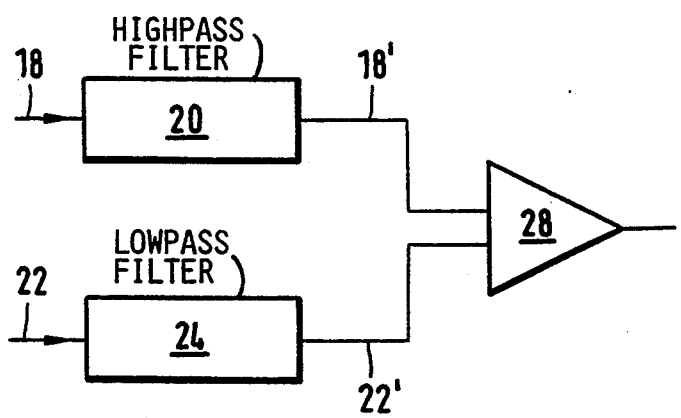
FIG. 2 is a schematic representation of the rotation rate signals filtered through lowpass filters and highpass filters according to the invention.

The filtered output signals for vehicle rotation rates 18' and 22' are then combined in a known manner in a sum amplifier 28 as shown in FIG. 2.

Figure 7:
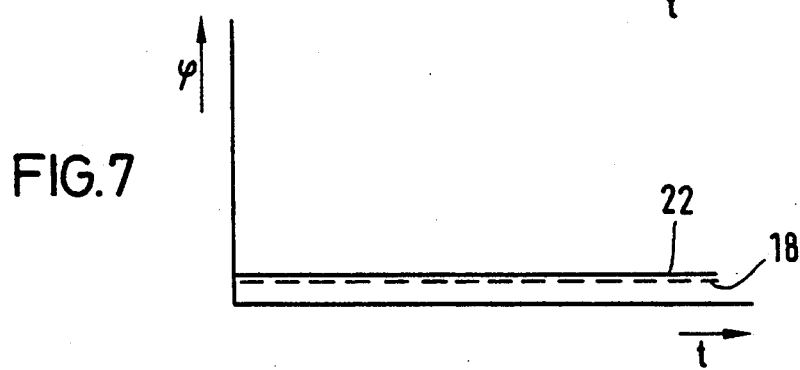
FIG. 7 shows the curve for a rotation rate signal that is free of interferences from a gyro and rear wheel sensor.

With the above-described suppression of the primarily sensor specific interferences, an accurate vehicle rotation rate 22 (FIG. 7) is determined for the desired course, with the rotation rate signal 18 freed from drift 19 determining the desired course of the vehicle, for example, during an interference as a result of a pothole.

Figure 8:
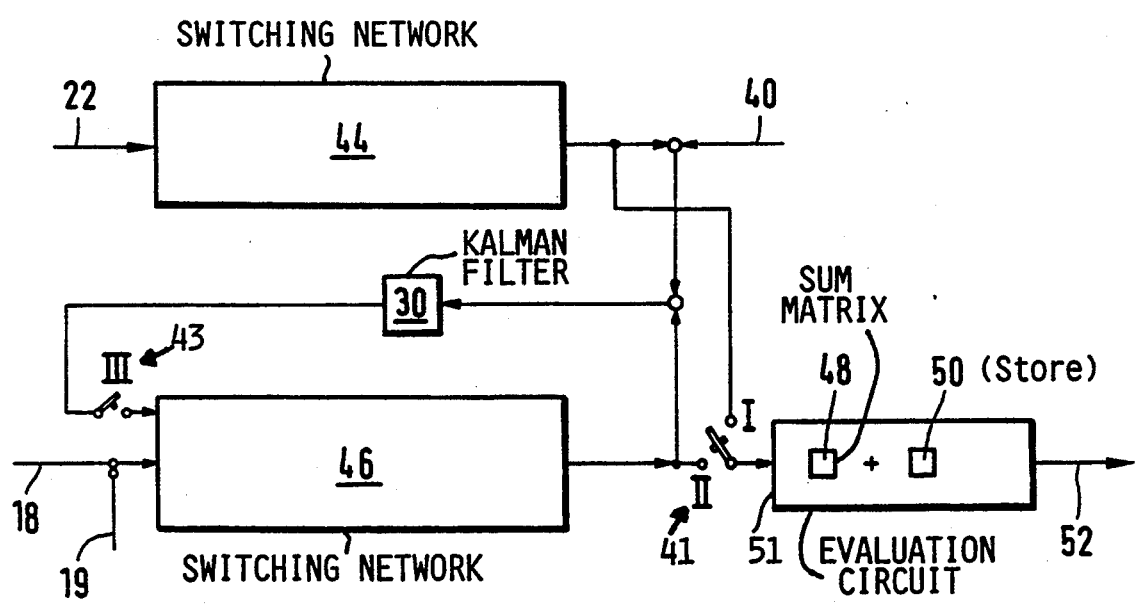
FIG. 8 shows a further embodiment in which the interferences in the rotation rate signals are eliminated by means of a Kalman filter.

The same, above-described, advantageous effect of the suppression of sensor caused interfering influences can be produced by a Kalman filter 30 which generates highpass and lowpass filtering. This filter is shown schematically in FIG. 8.

Here an amplifier matrix (not shown in detail) of the Kalman filter 30 acts in such a manner that the rotation rate information 18 generated by gyro arrangement 12 is conducted through a highpass filter layer and the rotation rate signal 22 obtained from wheel sensor 10 is conducted through a lowpass filter (also not shown in detail).

Navigation by means of Kalman filter 30 is possible in the closed switch positions II and III of switches 41 and 43 respectively. The rotation rate signals 22 of wheel sensor 10, after leaving a network 44 required for switching, and the rotation rate signals 18 of gyro 12, after leaving a corresponding switching network 46, are fed to the Kalman filter 30. As a result, the obtained sum matrix 48 is compared with the stored desired values 50 of the vehicle navigation system in an evaluation circuit 51 and from it the vehicle position angle 52 is calculated.

On smooth ground a simple mode of operation with only a wheel coder is also possible by closed switch position I of switch 41 while closed switch position II of switch 41 permits gyro navigation.

The devices employed in the various embodiments, i.e., highpass filter 20, lowpass filter 24, and sum amplifier 28, or Kalman filter 30, networks 44, 46, and sum matrix 48, are available on the market and are thus state of the art so that a detailed description of these components is not necessary.

The invention now being fully described, it will be apparent to one of ordinary skill in the art that any changes and modifications can be made thereto without departing from the spirit or scope of the invention as set forth herein.

What is claimed is:

1. A method of determining the actual rotation rate of a vehicle provided with wheel sensors configured as path sensors for detecting the vehicle movement and a gyro arrangement for detecting the orientation of the vehicle, said method comprising:

generating signals corresponding to the movement of the vehicle by the path sensors;

continuously detecting and producing output signals corresponding to the orientation of the vehicle by the gyro arrangement;

processing the respective signals generated by the path sensors and by the gyro arrangement to form respective rotation rate signals;

differentiating with respect to time by highpass filtering each rotation rate signal generated in response to an output signal from the gyro arrangement;

integrating with respect to time by lowpass filtering each rotation rate signal generated in response to output signals from the path sensors; and combining the differentiated highpass filtered and integrated lowpass filtered signals to determine the actual rotation rate of the vehicle;

wherein said step of highpass filtering includes passing the rotation rate signals associated with the gyro arrangement through a highpass filter which suppresses rotation rate signals of a magnitude of the drift frequency of the gyro arrangement;

wherein said step of lowpass filtering comprises passing the rotation rate signals associated with the path sensors through a lowpass filter which passes only rotation rate signals occurring during normal, interference-free operation of the vehicle.

2. A method as defined in claim 1, wherein said step of combining comprises summing the differentiated highpass filtered and integrated lowpass filtered signals.

3. A method as defined in claim 1, wherein said step of integrating by lowpass filtering comprises passing the rotation rate signals associated with the path sensors through a lowpass filter which passes only rotation rate signals occurring during normal, interference-free operation of the vehicle.

4. A method as defined in claim 3, wherein said step of combining comprises summing the differentiated highpass filtered and integrated lowpass filtered signals.

5. In a self-steering vehicle including at least one driven and steerable front wheel and free wheeling non-driven rear wheels, a steering mechanism for steering said at least one front wheel, and a control system for providing steering instructions to said steering mechanism, with said control system including a gyro means for continuously detecting the orientation of the vehicle and producing a corresponding first rotation rate signal, path sensor means, including a sensor disposed on each of said rear wheels for sensing the movement of said vehicle, for producing corresponding second rotation rate signals, and evaluation circuit means responsive to said first and second rotation rate signals for producing said steering instructions; an improvement wherein said control system further includes:

a highpass filter differentiating with respect to time means for differentiating said first rotation rate signals to suppress rotation rate signals of a magnitude of any drift frequency of said gyro means;

lowpass filter integrating with respect to time means for integrating said second rotation rate signals to pass only rotation rate signals of the type occurring during normal interference-free operation of said vehicle; and means for combining output signals from said highpass filter differentiating means and said lowpass filter integrating means and for feeding a combined output signal to said evaluation circuit means.

6. A vehicle as defined in claim 5, wherein said means for combining comprises a summing amplifier.

7. A vehicle as defined in claim 5, wherein said highpass filter differentiating means and said lowpass filter integrating means comprise a Kalman filter.

* * * * *